United States Patent
Sanaullah et al.

(10) Patent No.: US 9,344,404 B2
(45) Date of Patent: May 17, 2016

(54) SYSTEM AND METHOD FOR SYNCHRONIZING CONNECTION CREDENTIALS

(71) Applicant: Dell Products L.P., Round Rock, TX (US)

(72) Inventors: Abu Shaher Sanaullah, Austin, TX (US); Yuan-Chang Lo, Austin, TX (US); Raziuddin Ali, Austin, TX (US); Claude Lano Cox, Austin, TX (US); Michael S. Gatson, Austin, TX (US); Karthikeyan Krishnakumar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/755,266

(22) Filed: Jan. 31, 2013

(65) Prior Publication Data

US 2014/0215585 A1 Jul. 31, 2014

(51) Int. Cl.
*H04L 29/06* (2006.01)
*H04W 12/06* (2009.01)

(52) U.S. Cl.
CPC ............ *H04L 63/0281* (2013.01); *H04L 63/08* (2013.01); *H04L 63/18* (2013.01); *H04W 12/06* (2013.01)

(58) Field of Classification Search
CPC ....... H04W 88/00; H04W 8/00; H04W 72/00; H04W 12/08; H04W 12/06; H04L 63/0884; H04L 67/28; H04L 29/08702; H04L 63/0281; H04L 63/08; H04L 63/18
See application file for complete search history.

(56) References Cited

U.S. PATENT DOCUMENTS

| | | | |
|---|---|---|---|
| 6,965,674 B2 * | 11/2005 | Whelan et al. | 380/270 |
| 8,332,272 B2 | 12/2012 | Fisher | |
| 2003/0196084 A1 * | 10/2003 | Okereke et al. | 713/156 |
| 2006/0165060 A1 * | 7/2006 | Dua | 370/352 |
| 2007/0153732 A1 * | 7/2007 | Yao | 370/329 |
| 2008/0013513 A1 * | 1/2008 | Kurokawa | 370/338 |
| 2008/0301790 A1 * | 12/2008 | Halasz et al. | 726/6 |
| 2009/0219844 A1 * | 9/2009 | Soliman | 370/311 |
| 2009/0264098 A1 | 10/2009 | Lo et al. | |
| 2011/0040888 A1 * | 2/2011 | Krishnaswamy et al. | 709/231 |
| 2011/0081006 A1 * | 4/2011 | Hao et al. | 379/88.13 |
| 2011/0158409 A1 * | 6/2011 | Sugawara et al. | 380/270 |
| 2011/0223860 A1 | 9/2011 | Lo et al. | |
| 2011/0264543 A1 * | 10/2011 | Taveau | G06Q 20/12 705/23 |
| 2012/0221605 A1 | 8/2012 | Sanghvi et al. | |
| 2012/0286928 A1 | 11/2012 | Mullen et al. | |
| 2012/0315846 A1 | 12/2012 | Gartner et al. | |
| 2012/0315848 A1 | 12/2012 | Smith et al. | |

(Continued)

*Primary Examiner* — Chau Le
*Assistant Examiner* — Muhammad Chaudhry
(74) *Attorney, Agent, or Firm* — Winstead PC

(57) ABSTRACT

In one embodiment, a method includes establishing a connection with an access-point (AP) device via a first communication path. The method further includes establishing a connection with a proxy device for the AP device via a second communication path that is distinct from the first communication path. In addition, the method includes determining a set of connection credentials maintained by the AP device. Furthermore, the method includes determining a set of connection credentials maintained by the proxy device. Additionally, the method includes identifying a correct set of connection credentials. The correct set includes at least one of the first set and the second set. The method also includes synchronizing the first set and the second set according to the correct set.

14 Claims, 2 Drawing Sheets

(56) References Cited

U.S. PATENT DOCUMENTS

| | | | |
|---|---|---|---|
| 2013/0167167 A1* | 6/2013 | Steyer et al. | 725/5 |
| 2013/0201515 A1* | 8/2013 | Daos et al. | 358/1.14 |
| 2013/0222839 A1* | 8/2013 | Armstrong | G06F 3/1203 358/1.14 |
| 2014/0187147 A1* | 7/2014 | Rochberger | H04W 8/005 455/41.1 |
| 2014/0201066 A1* | 7/2014 | Roux | G06Q 20/3278 705/39 |
| 2014/0204727 A1* | 7/2014 | Gu et al. | 370/217 |
| 2014/0208112 A1* | 7/2014 | McDonald et al. | 713/171 |
| 2014/0215572 A1* | 7/2014 | Datta et al. | 726/4 |

* cited by examiner

SYSTEM AND METHOD FOR SYNCHRONIZING CONNECTION CREDENTIALS

BACKGROUND

1. Technical Field

The present invention relates generally to information security and more particularly, but not by way of limitation, to systems and methods for synchronizing connection credentials.

2. History of Related Art

When an access-point device such as, for example, a projector, is out of reach of a user, a proxy such as a remote control can be used to associate the access-point device with a connecting device via, for example, near-field communication (NFC). A proxy token stored by the proxy contains connection credentials for the access-point device. When the proxy is brought within range of the connecting device, the proxy token can be transferred to the connecting device via NFC. The connecting device can then use the connection credentials stored therein to connect to the access-point device. However, the connection credentials maintained by the proxy and connection credentials maintained by the access-point device often become out-of-sync. For example, the proxy may be new or the connection credentials maintained by the access-point device may have been updated. When this occurs, the proxy is no longer effective for its purpose.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes establishing, by an information handling system, a connection with an access-point (AP) device via a first communication path. The method further includes establishing, by the information handling system, a connection with a proxy device for the AP device via a second communication path that is distinct from the first communication path. In addition, the method includes determining, by the information handling system, a set of connection credentials maintained by the AP device. Furthermore, the method includes determining, by the information handling system, a set of connection credentials maintained by the proxy device. Additionally, the method includes identifying, by the information handling system, a correct set of connection credentials. The correct set includes at least one of the first set and the second set. The method also includes synchronizing, by the information handling system, the first set and the second set according to the correct set.

In one embodiment, an information handling system includes a first network interface operable to enable connections thereto, a second network interface operable to enable connections thereto, and a processing unit communicably coupled to the first network interface and the second network interface. The processing unit is operable to establish a connection with an access-point (AP) device via the first network interface. The processing unit is further operable to establish a connection with a proxy device for the AP device via the second network interface. In addition, the processing unit is operable to determine a set of connection credentials maintained by the AP device. Further, the processing unit is operable to determine a set of connection credentials maintained by the proxy device. Additionally, the processing unit is operable to identify a correct set of connection credentials. The correct set includes at least one of the first set and the second set. The processing unit is also operable to synchronize the first set and the second set according to the correct set.

In one embodiment, a computer-program product includes a computer-usable medium having computer-readable program code embodied therein. The computer-readable program code is adapted to be executed to implement a method. The method includes establishing a connection with an access-point (AP) device via a first communication path. The method further includes establishing a connection with a proxy device for the AP device via a second communication path that is distinct from the first communication path. In addition, the method includes determining a set of connection credentials maintained by the AP device. Furthermore, the method includes determining a set of connection credentials maintained by the proxy device. Additionally, the method includes identifying a correct set of connection credentials. The correct set includes at least one of the first set and the second set. The method also includes synchronizing the first set and the second set according to the correct set.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In various embodiments, connection credentials maintained by an access-point (AP) device and connection credentials maintained by a proxy device can be synchronized utilizing systems and methods described herein. For purposes of this patent application, connection credentials are information elements that are used to establish a network connection. Connection credentials can include, for example, a Service Set Identifier (SSID), a wireless password (e.g., a pre-shared key), a shared secret, and other similar information.

An AP device, as used herein, is an information handling system that allows other information handling systems to wirelessly connect to it using Wi-Fi or related standards. A proxy device, as used herein, is an information handling system that is operable to store and provide connection credentials for a given AP device. A configuration device, as used herein, is an information handling system that is operable access and edit connection credentials stored on both an AP device and its proxy device. It should be appreciated that, in various embodiments, a given AP device can have more than one proxy device.

Figure 1:
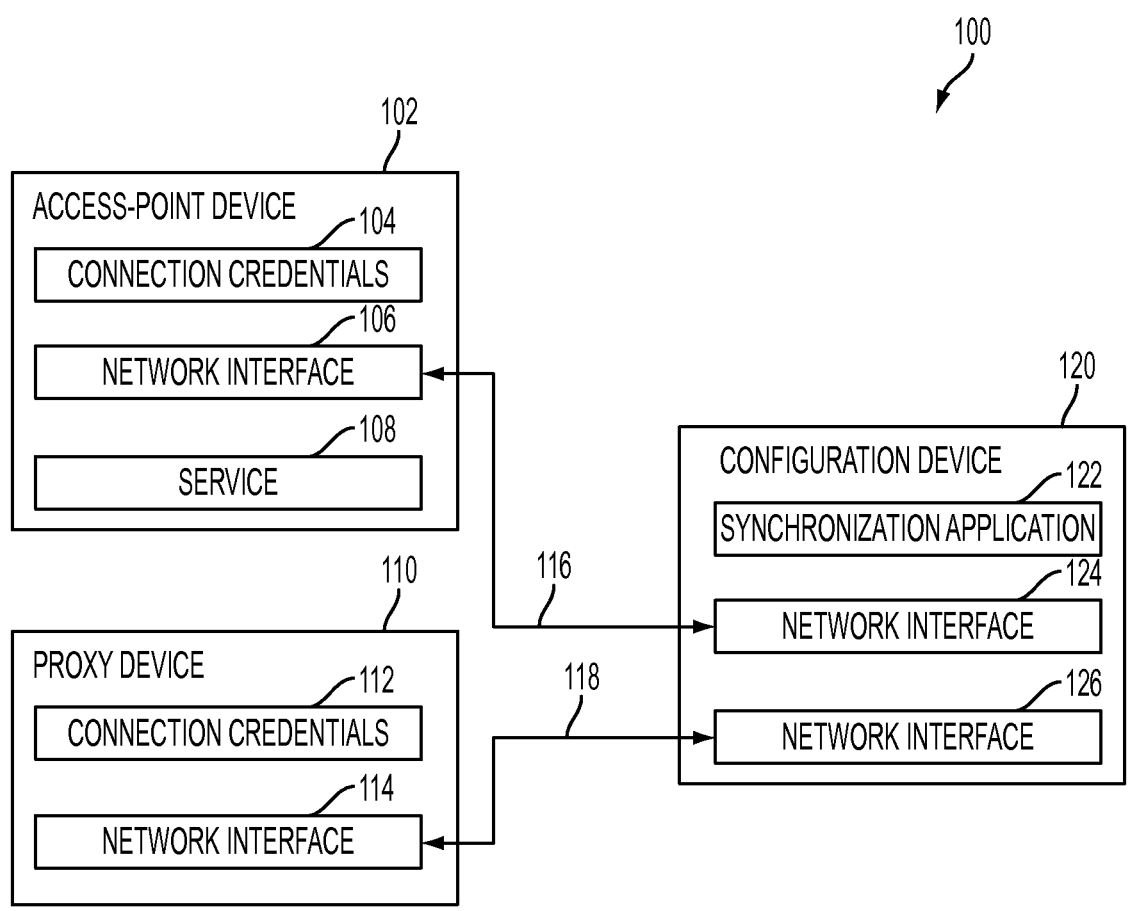
FIG. 1 illustrates a system for synchronization of connection credentials.

FIG. 1 illustrates a system 100 for synchronization of connection credentials. The system 100 includes an AP device 102, a proxy device 110, and a configuration device 120. The AP device 102 can be, for example, a printer, projector, or other information handling system. In similar fashion, the proxy device 110 can be, for example, a smart phone, desktop computer, laptop computer, remote control, or other information handling system. Similarly, the configuration device 120 can be, for example, a desktop computer, laptop computer, tablet, smart phone, or other information handling system.

In a typical embodiment, the AP device 102 is operable to provide a service 108 to information handling systems that connect thereto via a network interface 106. In various embodiments, the service 108 can include printing, screen projection, network access, or the like. In a typical embodiment, the network interface 106 is a Wi-Fi direct network interface that allows direct peer-to-peer (P2P) connections thereto; however, other communication protocols such as, for example, Bluetooth can also be utilized. The AP device 102 maintains connection credentials 104 that are used by information handling systems to establish connections via the network interface 106. The connection credentials can include, for example, a SSID, a wireless password (e.g., a pre-shared key), a shared secret, and other similar information that is used to establish connections.

The proxy device 110 maintains connection credentials 112 that, in a typical embodiment, are intended to correspond to the connection credentials 104. The proxy device 110 is operable to establish network communication via a network interface 114. In a typical embodiment, the network interface 114 is a near-field communication (NFC) interface provided, for example, by an NFC tag. According to NFC standards, when another information handling system with NFC capabilities is brought into close proximity with the proxy device 110 (e.g., within a few centimeters), communication via NFC can occur.

The configuration device 120 includes a network interface 124, a network interface 126, and a synchronization application 122 loaded and executing thereon. In a typical embodiment, the network interface 124 is operable to communicate via Wi-Fi and related standards while the network interface 126 is operable to communicate via NFC and related standards. However, it should be appreciated that other communication protocols can also be supported such as, for example, Bluetooth and related standards.

In operation, the synchronization application 122 provides a password-protected user interface that allows a user to request synchronization of the connection credentials 104 and the connection credentials 112. The synchronization application 122 utilizes the network interface 124 and the network interface 126 to perform the synchronization. In particular, the synchronization application 122 establishes a communication path 116 between the network interface 124 of the configuration device 120 and the network interface 106 of the AP device 102. The synchronization application 122 also establishes a communication path 118 between a network interface 126 of the configuration device 120 and a network interface 114 of the proxy device 110.

The communication path 116 can be established in various fashions. For example, in various embodiments, the synchronization application 122 can use a dedicated management Wi-Fi channel of the AP device 102. The dedicated management Wi-Fi channel could have, for example, its own SSID and pre-shared key. In these embodiments, additional security could be afforded by requiring the synchronization application 122 to provide a certificate by which the AP device 102 authenticates the synchronization application 122. In various other embodiments, the synchronization application 122 can maintain a history of Wi-Fi settings for the AP device 102 beginning with factory-default settings. In these embodiments, the synchronization application 122 can attempt to establish the communication path 116, for example, via a most recent set of wireless settings.

Via the communication path 116, the synchronization application 122 is able to obtain and edit the connection credentials 104 of the AP device 102. Via the communication path 118, the synchronization application 122 is able to obtain and edit the connection credentials 112 of the proxy device 110. In this manner, the synchronization application 122 can compare the connection credentials 104 and the connection credentials 112 and update as necessary. An example will be described with respect to FIG. 2.

Figure 2:
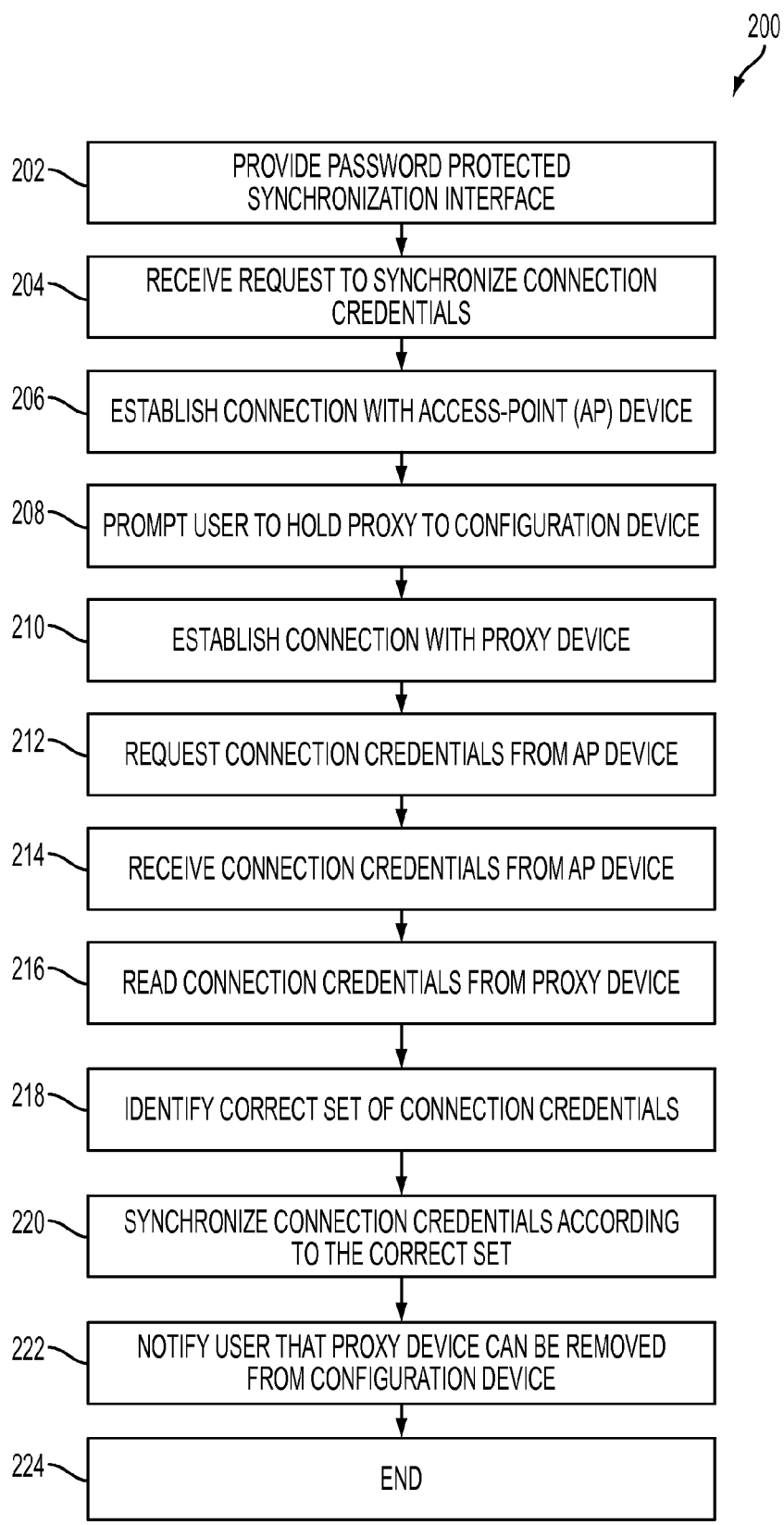
FIG. 2 illustrates a process that can be executed by a synchronization application resident and executing on a configuration device.

FIG. 2 illustrates a process 200 that can be executed by a synchronization application resident and executing on a configuration device. The configuration device is connectable to an AP device and its proxy device. In a typical embodiment, the configuration device, the synchronization application, the AP device, and the proxy device operate as described with respect to the configuration device 120, the synchronization application 122, the AP device 102, and the proxy device 110, respectively, of FIG. 1. The process 200 begins at step 202.

At step 202, the synchronization application provides a password-protected synchronization interface to a user of the configuration device. From step 202, the process 200 proceeds to step 204. At step 204, the synchronization application receives a request to synchronize connection credentials maintained by the AP device and connection credentials maintained by the proxy device. In a typical embodiment, the request is received as a result of the user selecting an appropriate option via the password-protected synchronization interface. From step 204, the process 200 proceeds to step 206.

At step 206, the synchronization application establishes a connection to the AP device. In a typical embodiment, the connection is established in accordance with Wi-Fi and related standards. The connection can be established, for example, as described with respect to the communication path 116 of FIG. 1. From step 206, the process 200 proceeds to step 208. At step 208, the synchronization application prompts the user to hold the proxy device to the configuration device. In a typical embodiment, this action by the user facilitates establishment of a connection via NFC as described with respect to FIG. 1. From step 208, the process 200 proceeds to step 210.

At step 210, the synchronization application establishes a connection to the proxy device. In a typical embodiment, the connection is established in accordance with NFC and related standards. The connection can be, for example, over a communication path similar to the communication path 118 of FIG. 1. From step 210, the process 200 proceeds to step 212. At step 212, the synchronization application requests the connection credentials maintained by the AP device. From step 212, the process 200 proceeds to step 214. At step 214, the synchronization application receives the connection credentials maintained by the AP device. From step 214, the process 200 proceeds to step 216. At step 216, the synchronization application reads the connection credentials maintained by the proxy device, for example, on its NFC tag. From step 216, the process 200 proceeds to step 218.

At step 218, a correct set of connection credentials is identified. The correct set of connection credentials represent those connection credentials that should be used as a baseline for synchronization and stored on both the AP device and the proxy device. In various embodiments, the synchronization application may prompt the user to choose between the connection credentials maintained by the AP device and the connection credentials maintained by the proxy device. The synchronization application may also allow the user to generate a new set of credentials. In these embodiments, the identification is based on the user's choice. In various other embodiments, the synchronization application may automatically select a most recent set of credentials or choose based on other criteria. In still other embodiments, the synchronization application may default to the connection credentials maintained by the AP device. From step 218, the process 200 proceeds to step 220.

At step 220, the synchronization application synchronizes the connection credentials maintained by each of the AP device and the proxy device. For example, if the connection credentials from the AP device are identified as the correct set of connection credentials at step 218, the synchronization application updates the connection credentials maintained by the proxy device in conformance to the connection credentials maintained by the AP device. In a typical embodiment, the update involves generating an NFC tag write request with the connection credentials maintained by the AP device. By way of further example, if the connection credentials from the proxy device are identified as the correct set of connection credentials at step 218, the synchronization application updates the connection credentials maintained by the AP device in conformance to the connection credentials maintained by the proxy device. In a typical embodiment, the update involves interfacing with the AP device to store the connection credentials maintained by the proxy device.

Additionally, if, for example, the correct set of connection credentials is a newly generated set of connection credentials that is not maintained by either the proxy device or the AP device, the synchronization application updates the connection credentials maintained by both the proxy device and the AP device in conformance to the newly generated set of connection credentials. In a typical embodiment, the update of the proxy device involves generating an NFC tag write request with the newly generated set of connection credentials. In a typical embodiment, the update of the AP device involves interfacing with the AP device to store the newly generated set of connection credentials. From step 220, the process 200 proceeds to step 222. At step 222, the synchronization application notifies the user that the proxy device can be removed from the configuration device. From step 222, the process 200 proceeds to step 224. At step 224, the process 200 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   establishing, by an information handling system, a first connection with an access-point (AP) device via a first communication path;
   wherein the information handling system comprises a first network interface configured to enable the first connection and a second network interface configured to enable a second connection;
   wherein the first network interface and the second network interface of the information handling system are distinct interfaces;
   wherein the AP device provides a service to information handling systems in possession of a first set of connection credentials maintained by the AP device;
   establishing, by the information handling system, the second connection with a proxy device for the AP device via a second communication path that is distinct from the first communication path, wherein the second connection establishment with the proxy device is facilitated by bringing the proxy device in close proximity with the information handling system;
   wherein the proxy device is configured to store a second set of connection credentials and provide the second set of connection credentials as connection credentials for the AP device;
   wherein the AP device provides the service using a first communication protocol, the proxy device provides the second set of connection credentials using a second communication protocol, and the first communication protocol is different from the second communication protocol;
   determining, by the information handling system, the first set of connection credentials maintained by the AP device;
   determining, by the information handling system, the second set of connection credentials stored by the proxy device;
   identifying, by the information handling system, a correct set of connection credentials for the AP device;
   synchronizing, by the information handling system, the first set and the second set according to the correct set;
   wherein the identifying comprises selecting, by the information handling system, a most recent set of credentials between the first set of connection credentials maintained by the AP device and the second set of connection credentials stored by the proxy device;

wherein the correct set of connection credentials represent connection credentials that are used as a baseline for synchronization and are stored on both the AP device and the proxy device;

wherein the second communication path comprises near-field communication (NFC);

wherein the correct set of connection credentials comprises the second set of connection credentials stored by the proxy device; and wherein the synchronizing comprises updating the first set of connection credentials maintained by the AP device in conformance to the second set of connection credentials stored by the proxy device.

2. The method of claim 1, wherein the first communication path comprises communication via at least one method selected from the group consisting of: Wi-Fi and Bluetooth.

3. The method of claim 1, wherein the proxy device comprises a remote control for the AP device.

4. The method of claim 1, wherein the AP device comprises a projector.

5. The method of claim 1, wherein the identifying comprises prompting a user to choose the correct set of connection of credentials.

6. The method of claim 1, wherein:
the correct set of connection credentials comprises the first set of connection credentials maintained by the AP device; and
the synchronizing comprises updating the second set of connection credentials stored by the proxy device in conformance to the first set of connection credentials maintained by the AP device.

7. The method of claim 1, wherein:
the correct set of connection credentials comprises a newly generated set of connection credentials; and
the synchronizing comprises:
updating the first set of connection credentials maintained by the AP device in conformance to the newly generated set of connection credentials; and
updating the second set of connection credentials stored by the proxy device in conformance to the newly generated set of connection credentials.

8. An information handling system comprising:
a first network interface configured to enable connections thereto;
a second network interface configured to enable connections thereto;
wherein the first network interface and the second network interface of the information handling system are distinct interfaces;
a processor communicably coupled to the first network interface and the second network interface, wherein the processor is configured to:
establish a connection with an access-point (AP) device via the first network interface;
wherein the AP device provides a service to information handling systems in possession of a first set of connection credentials maintained by the AP device;
establish a connection with a proxy device for the AP device via the second network interface, wherein the connection establishment with the proxy device is facilitated by bringing the proxy device in close proximity with the information handling system;
wherein the proxy device is configured to store a second set of connection credentials and provide the second set of connection credentials as connection credentials for the AP device;
wherein the AP device provides the service using a first communication protocol, the proxy device provides the second set of connection credentials using a second communication protocol, and the first communication protocol is different from the second communication protocol;
determine the first set of connection credentials maintained by the AP device;
determine the second set of connection credentials stored by the proxy device;
identify a correct set of connection credentials;
synchronize the first set and the second set according to the correct set;
wherein the identification comprises selection, by the information handling system, of a most recent set of credentials between the first set of connection credentials maintained by the AP device and the second set of connection credentials stored by the proxy device;
wherein the correct set of connection credentials represent connection credentials that are used as a baseline for synchronization and are stored on both the AP device and the proxy device;
wherein the second network interface is configured to communicate via near-field communication (NFC);
wherein the correct set of connection credentials comprises the second set of connection credentials stored by the proxy device; and
wherein the synchronization comprises updating the first set of connection credentials maintained by the AP device in conformance to the second set of connection credentials stored by the proxy device.

9. The information handling system of claim 8, wherein the first network interface is configured to communicate via at least one method selected from the group consisting of: Wi-Fi and Bluetooth.

10. The information handling system of claim 8, wherein the proxy device comprises a remote control for the AP device.

11. The information handling system of claim 8, wherein the AP device comprises a projector.

12. The information handling system of claim 8, wherein:
the correct set of connection credentials comprises the first set of connection credentials maintained by the AP device; and
the synchronization comprises updating the second set of connection credentials stored by the proxy device in conformance to the first set of connection credentials maintained by the AP device.

13. The information handling system of claim 8, wherein:
the correct set of connection credentials comprises a newly generated set of connection credentials; and
the synchronization comprises:
updating the first set of connection credentials maintained by the AP device in conformance to the newly generated set of connection credentials; and
updating the second set of connection credentials stored by the proxy device in conformance to the newly generated set of connection credentials.

14. A computer-program product comprising a non-transitory computer-usable medium having computer-readable program code embodied therein, the computer-readable program code adapted to be executed to implement a method comprising:

establishing a first connection with an access-point (AP) device via a first communication path;

wherein the information handling system comprises a first network interface configured to enable the first connection and a second network interface configured to enable a second connection;

wherein the AP device provides a service to information handling systems in possession of a first set of connection credentials maintained by the AP device;

establishing the second connection with a proxy device for the AP device via a second communication path that is distinct from the first communication path, wherein the second connection establishment with the proxy device is facilitated by bringing the proxy device in close proximity with the information handling system;

wherein the proxy device is configured to store a second set of connection credentials and provide the second set of connection credentials as connection credentials for the AP device;

wherein the AP device provides the service using a first communication protocol, the proxy device provides the second set of connection credentials using a second communication protocol, and the first communication protocol is different from the second communication protocol;

determining the first set of connection credentials maintained by the AP device;

determining the second set of connection credentials stored by the proxy device;

identifying a correct set of connection credentials;

synchronizing the first set and the second set according to the correct set;

wherein the identifying comprises selecting, by the information handling system, a most recent set of credentials between the first set of connection credentials maintained by the AP device and the second set of connection credentials stored by the proxy device;

wherein the correct set of connection credentials represent connection credentials that are used as a baseline for synchronization and are stored on both the AP device and the proxy device;

wherein the second communication path comprises near-field communication (NFC);

wherein the correct set of connection credentials comprises the second set of connection credentials stored by the proxy device; and wherein the synchronizing comprises updating the first set of connection credentials maintained by the AP device in conformance to the second set of connection credentials stored by the proxy device.

* * * * *